United States Patent [19]
Geck et al.

[11] 3,982,926
[45] Sept. 28, 1976

[54] METHOD FOR MELTING CHARGES

[75] Inventors: Gunther Geck, Hagen; Hans Jurgen Langhammer, Bremen-Platjgenwerbe, both of Germany

[73] Assignee: Klockner-Werke AG, Duisburg, Germany

[22] Filed: May 28, 1974

[21] Appl. No.: 473,900

[30] Foreign Application Priority Data
May 26, 1973 Germany.............................. 2327072

[52] U.S. Cl...................................... 75/48; 75/43; 75/44 S
[51] Int. Cl.²........................................... C21C 7/00
[58] Field of Search...................... 75/48, 43, 44 RS

[56] References Cited
UNITED STATES PATENTS

| | | | |
|---|---|---|---|
| 1,934,082 | 11/1933 | Moll et al......................... | 75/42 UX |
| 1,948,695 | 2/1934 | Brassert...................... | 75/43 |
| 3,151,974 | 10/1964 | Rheinlander.......................... | 75/42 |
| 3,236,628 | 2/1966 | von Bogdandy....................... | 75/11 |

FOREIGN PATENTS OR APPLICATIONS

| | | | |
|---|---|---|---|
| 1,229,852 | 3/1960 | France................................ | 75/44 S |
| 773,191 | 4/1957 | United Kingdom.................. | 75/44 S |
| 998,213 | 7/1965 | United Kingdom.................. | 75/44 S |

*Primary Examiner*—M. J. Andrews
*Attorney, Agent, or Firm*—Michael J. Striker

[57] ABSTRACT

A charge consisting of scrap, sponge iron, pellets and the like is admitted into a vertically arranged melting chamber and forms a column therein. The leading end of the column is melted with an annular flame generated by means of an annular burner or a plurality of burners arranged circumferentially of the melting chamber. In this manner, a downwardly extending projection is formed within the confines of the periphery of the leading end of the column and this bears against the bottom of the melting chamber thereby supporting the column. An outlet for the molten material is provided in the bottom of the chamber and this is surrounded by a projection extending upwardly from the bottom of the chamber. The latter projection is effective for permitting the molten material to remain on the bottom of the chamber for a short period prior to its outflow from the chamber so that the molten material is superheated by the flame. It is of advantage when the dimensions of the projection in the leading end of the column are maintained sufficiently small to prevent substantial heat transfer from the molten material to the column.

9 Claims, 2 Drawing Figures

METHOD FOR MELTING CHARGES

BACKGROUND OF THE INVENTION

The invention relates generally to a method and arrangement for melting charges.

A method for the continuous melting of scrap is known from the German Pat. No. 1,800,610. Scrap is charged into a vertically arranged melting chamber of substantially constant cross-section and forms a column therein. The column is melted from below with a flame which extends across the major part of the cross-section of the column and the flame is positioned at such a height above the bottom of the chamber that the molten material wich flows off is able to form a thermal barrier for the fire-resistant lining of the chamber. Melting with the high-temperature burners occurs in countercurrent fashion in that the scrap moves downwardly in the chamber while the combustion gases flow upwardly therein. The flame used for the melting operation is centrally positioned and is of plate-shaped configuration. This flame is generated by means of a burner lance which is located on the axis of the melting chamber and which extends into the latter either through the column of scrap or through the bottom of the chamber.

A plate-shaped flame which is generated by a centrally positioned burner lance, however, possesses the disadvantage that its diameter cannot be increased as desired so that, when the melting chamber is of large cross-section, it is not possible for the column of charge to be impinged by the flame over the major part of its cross-section. In this connection, it may be seen that large cross-sections for the melting chamber are of importance for increasing the throughput capacity. Furthermore, melting chambers of large cross-section make is possible the charge bulky types of scrap which do not require much preparation prior to being charged since the size of the charging opening of the melting chamber may then be increased correspondingly.

Also, in the above-described method, the molten material has a temperature which is only slightly higher than its liquidus temperature. This is disadvantageous when the molten material must be transported from the melting chamber to a converter, a Siemens-Martin oven or the like. Moreover, this may lead to blockage of the outlet opening of the melting chamber by molten material which has solidified, particularly when the molten material is to be further processed in a discontinuous operation so that the melting procedure must be interrupted.

SUMMARY OF THE INVENTION

Accordingly, it is an object of the invention to provide a method and arrangement for melting charges which enable the disadvantages outlined above to be overcome and enable an improvement over the melting procedure outlined above to be realized.

Another object of the invention is to provide a method and arrangement which enable charges to be melted at high throughput.

A further object of the invention is to provide a method and arrangement for melting charges which enable freezing of the molten material in the melting chamber to be prevented.

An additional object of the invention is to provide a method and arrangement for melting charges which enable the melting procedure outlined above to be improved in that the throughput capacity may be increased while solidification of the molten material at the bottom or in the outlet of the melting chamber as well as thereafter, may be avoided so that the above-outlined disadvantages may be eliminated.

The listed objects, as well as others which will become apparent hereinafter, are achieved in accordance with the invention one feature of which, stated in brief, resides in a method of melting a charge, particularly for use in the melting of scrap, sponge iron, pre-reduced pellets and the like at high throughput, wherein a charge is admitted into a vertically arranged melting zone or chamber so as to form a column therein. The leading end of the column is melted in such a manner as to form a downwardly projecting portion in the leading end which is located at least in part within the confines of the periphery of the latter. The molten material produced by the melting operation is superheated in the melting chamber.

Thus, according to one feature of the invention, particular, although not exclusive, interest is directed to a method of melting a charge which is in the form of scrap such as iron scrap, sponge iron, pellets in prereduced form and the like. Of course, the charge may include mixtures of different substantces. The melting chamber and, consequently, the column of charge, may be of at least approximately constant cross-section and the melting chamber may have a high throughput capacity.

Melting of the charge may be effected by directing a flame at the column from below and the flame may extend across the major part of the cross-section of the column or the leading end thereof. The melting chamber may be provided with a fire-resistant or heat-resistant lining and it is of advantage when the flame is positioned so far above the bottom of the melting chamber that the molten material which flows off is able to form a thermal barrier or thermal insulation for the lining.

According to the invention, melting of the charge from below may be effected with a substantially ring-shaped or annular flame which preferably has a cutting torch-like configuration. In addition to melting the charge, the flame may simultaneously superheat the molen material.

When using an annular flame, a downwardly extending projection is formed in a center region of the leading end of the column and this may bear against the bottom of the melting chamber to support the column. Thus, the column may be supported at a center region of the chamber. This is in contrast to the German patent 1,800,610 where the column supports itself at the periphery of the melting chamber. The annular flame may simultaneously serve for superheating the molten material by suitable positioning thereof above the molten material which flows off. Such superheating is advantageous when, for example, the molten material is to be conveyed from the melting chamber to a converter, a Siemens-Martin oven or the like.

Advantageously, the ratio of the cross-section of the column of charge to the cross-section of the supporting projection formed by the melting operation is maintained of such large magnitude that heat transfer through the column of charge only insignificantly influences superheating of the molten material which flows off. In general, since the molten material will normally flow to the bottom of the melting chamber so that the projection formed in the leading end of the column and which bears against the bottom of the chamber will be in contact therewith, it is of advantage when at least the part of the projection which contacts the molten material is maintained of such small dimensions that substantial heat transfer from the molten material to the column is prevented.

In order to reduce its liquidus temperature, the molten material may already be carburized at the bottom of the melting chamber, for instance, by blowing in coal or the like. In this manner, a greater degree of superheating of the molten material may be achieved. It is also possible to provide additional means for superheating the molten material. Such means may be in the form of an induction coil or the like provided in the bottom of the melting chamber or in the form of a flame which is specifically directed at the molten material. Such a flame may be generated in various ways. Thus, it is possible to provide a burner or burners which are used in the melting operation and which generate a cutting torch-like or plate-shaped flame having a downwardly directed flame portion. On the other hand, it is also possible to provide a burner or burners which are in addition to those used for the melting operation and which generate a flame directed onto the molten material.

Another feature of the invention resides in an arrangement for melting a charge, particularly for use in the melting of scrap, sponge iron, pre-reduced pellets and the like at high throughput, which includes means defining a vertically arranged melting chamber adapted to accommodate a column of a charge. Means is provided for melting the leading end of the column in such a manner as to form in the latter a downwardly projecting portion located at least in part within the confines of the periphery of the leading end. There is further provided means for temporarily retaining the molten material produced by the melting operation in the chamber. This arrangement is particularly well-suited for carrying out the method of the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
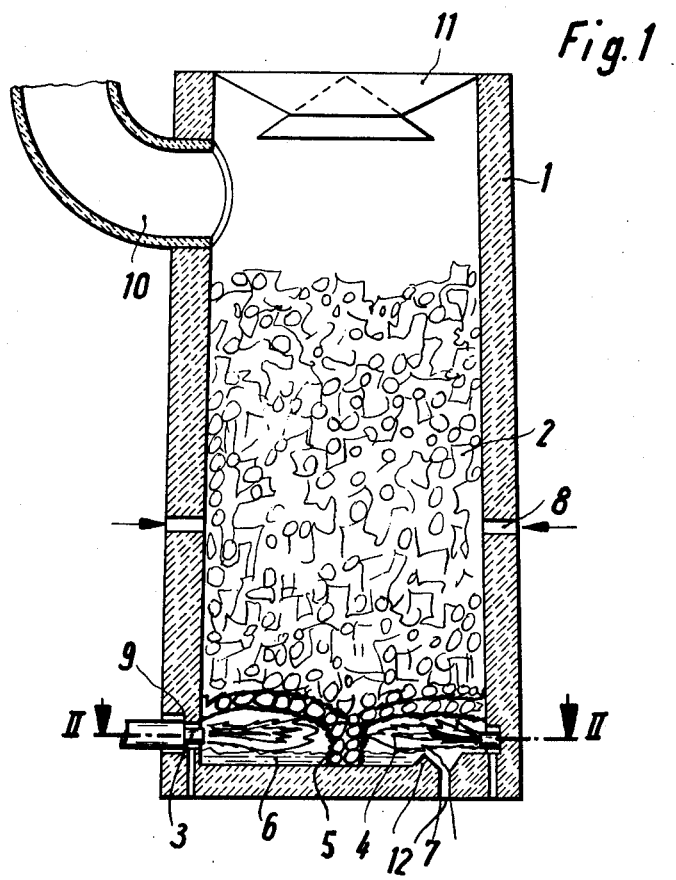
FIG. 1 is a longitudinal section through a schematic representation of one form of an arrangement according to the invention which may be used for carrying out the method of the invention.

As already mentioned, the arrangement in accordance with the invention includes a vertically arranged melting chamber and means for melting the leading end of a column of charge formed therein in a manner to form in the leading end a downwardly projecting portion which is at least partially located within the confines of the periphery of the leading end. The melting chamber may be provided with an outlet or opening at the bottom thereof for outflow or withdrawal of the molten material therefrom and means is provided for permitting a short dwell time of the molten material in the chamber between melting and outflow. The latter means may be in the form of a raised outlet at the bottom of the melting chamber, that is, the melting chamber may be provided with an upwardly extending projection at the bottom thereof which at least in part surrounds the opening through which the molten material flows out of the chamber. The melting means may include means for producing a substantially ring-shaped or annular flame, preferably one having a cutting torch-like configuration.

By virtue of the dwell time provided for the molten material in the chamber, there results a superheating of the molten material by the annular flame located above the latter which is favorable for the further processing of the molten material.

The annular flame may be generated by a plurality of burners distributed along the circumference of the melting chamber in the vicinity of the bottom thereof. Advantageously, the annular flame is generated by means of a corresponding ring-shaped or annular burner. The burner or burners may be oil-oxygen or oil-oxygen-air burners.

The burners may be constructed in such a manner as to permit different sections or segments of the leading end of the column to be differently impinged by the flame, that is, as to permit an individual adjustment of the heat supplied to various sections of the leading end. This is of advantage when, as a result of a non-uniform distribution of the charge, or in cases where non-uniform melting rates are used, certain regions are to be differently impinged. In a similar manner, by changing the direction and configuration of the flame, it becomes possible to cover regions where slower melting deposits have formed. This may also be effective for maintaining the continuity of the operation in that changes in the melting profile may be produced hereby. Moreover, a suitable configuration for the shape of the flame may be utilized for superheating of the molten material.

In general, the burners may be constructed in such a manner as to be adjustable for changing the heat output and/or the direction and/or the configuration and/or the dimensions of the flame. Where a plurality of burners are used, these may be independently adjustable.

Where several individual burners are used, the impingement of the flame should preferably not, however, lead to the formation of individual, disconnected, cavernlike cavities in the leading end of the column. The burners are preferably so adjusted that in every case a substantially disc-shaped total surface is produced which, to the inner region of the leading end where the supporting projection is located, does not exhibit any dead, that is, unmelted areas which may prevent an unhindered, uniform sinking or descent of the column of charge in the melting chamber.

A peripheral arrangement of the burner system, that is, an arrangement where the burner or burners are positioned at the circumference or periphery of the melting chamber, favorably simplifies attendance to and immediate observation of defects. The individual burners may burn in a sense directing the individual flames generated thereby directly towards the axis of the melting chamber or may also burn in a sense directing the individual flames generated thereby in a direction which is more tangential to the wall of the chamber. It is also possible to provide combination burner systems such as, for example, a combination of a peripheral burner system with a burner lance which extends into the melting chamber through the bottom thereof. In such an event, the downwardly extending projection formed in the leading end of the column and which supports the latter may be of substantially ring-shaped or annular configuration as opposed to the case where only a peripheral burner system is used and where the projection may have solid, substantially circular cross-section. When using a combination such as described, the burner lance is preferably positioned in a line with or on the axis of the melting chamber and advantageously generates a flame of substantially plate-shaped configuration which is substantially centered with respect to the cross-section of the melting chamber of the column.

Figure 2:
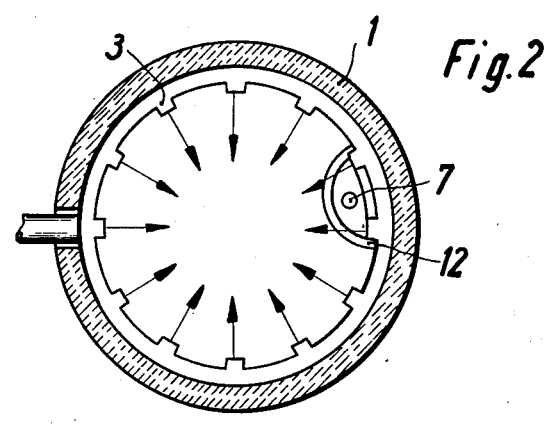
FIG. 2 is a view in the direction of the arrows II—II of FIG. 1.

Referring now to FIGS. 1 and 2, the reference numeral 1 indicates a melting chamber which may be of substantially cylindrical configuration. The chamber 1 may be of constant cross-section or may widen slightly in downward direction thereof. The interior of the chamber 1 may be lined with a fire-resistant or heat-resistant material.

At the upper end of the chamber 1 there is provided a charging opening in the region of which there may be provided a charging device 11 for use in charging the chamber 1. A charge such as scrap, sponge iron, pellets or the like is continuously admitted into the chamber 1 via the charging opening thereto. Charging of the chamber 1 may, for example, be accomplished with the help of a charging band or conveyor. The charge forms a column 2 in the chamber 1.

As best seen from FIG. 2, a plurality of burners 3 is arranged about the circumference of the chamber 1. The burners 3 generate an annular flame 4 having a cutting torch-like configuration. The flame 4 is directed at the column 2 from below the latter and melts the lower or leading end of the column 2. Due to the action of the flame 4, a rotational symmetric, disc-shaped cavity is produced in the leading end of the column 2 with the concomitant formation of a downwardly extending projection 5 in the leading end. It may be seen that the projection 5 formed in the leading end of the column 2 is located within the confines of the periphery of the leading end and, in the illustrated embodiment, is located in a center region of the leading end.

The projection 5 bears against the bottom of the chamber 1 thereby supporting the column 2. In this connection, it should be mentioned that the more heavily blackened region of the column 2 indicates a region thereof where the individual particles of the charge have welded to one another by virtue of the heat generated by the flame 4. This results in the formation of a supporting arch on which the charge above the leading end of the column 2 rests.

As the leading end of the column 2 melts, fresh charge moves downwardly in the chamber 1 to become exposed to the action of the flame 4. The molten material produced by the melting operation flows downwardly in the chamber 1. The molten material first flows onto the bottom of the chamber 1 to form a melt 6 and thereafter flows out of the chamber 1 through an outlet or opening 7 provided in the bottom of the chamber 1 and into a non-illustrated receiving vessel. It is of advantage when the flame 4 is positioned far enough above the bottom of the chamber 1 so as to permit the molten material which flows off to form a thermal barrier for the fire-resistant or heat-resistant lining in the bottom region of the chamber 1.

A projection 12 extends upwardly from the bottom of the chamber 1 and, as best observed in FIG. 2, extends in a direction around the opening 7, that is, extends in a direction surrounding the opening 7. The projection 12 has the effect of temporarily retaining the molten material on the bottom of the chamber 1. In other words, the projection 12 has the effect that the molten material is not able to flow off through the opening 7 immediately upon reaching the bottom of the chamber 1 but remains at the bottom of the chamber 1 for a certain period of time. This permits the molten material to become superheated by the flame 4.

The chamber 1 may be provided with a ring-shaped or annular slot 8. The purpose of the slot 8 is to permit air to be introduced into the chamber 1 so that the waste gases generated during the melting operation may be after-burned. In this manner, the waste gases may be used for preheating the charge to be melted. In addition, slits 9 may be provided about the burners 3. The slits 9 permit reducing gas such as methane or the like to be introduced into the chamber 1. Waste gases are exhausted from the chamber 1 via an exhaust conduit 10 provided in the region of the upper end of the chamber 1.

It will be understood that each of the elements described above, or two or more together, may also find a useful application in other types of melting methods and arrangements differing from the types described above.

While the invention has been illustrated and described as embodied in a method and arrangement for melting charges, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A melting method, comprising the steps of introducing a charge of iron scrap or iron sponge into an upright melting chamber having a bottom so as to form in said chamber a column of said charge having a leading end portion abutting said bottom and supporting the remaining portion of said column in said chamber; melting said column with an annular flame located in the region of said leading end portion and arranged intermediate said bottom and said remaining portion, said melting being performed in such a manner that said leading end portion has the form of a central projection which extends downwardly from said remaining portion to said bottom and has a cross-sectional area at substantially all locations intermediate said bottom and said remaining portion which is considerably smaller than that of said remaining portion; temporarily collecting the molten material produced by said melting at said bottom so as to form a pool of molten material which contacts said leading end portion, the heat transfer from said pool to said column being restricted due to the relatively small cross-sectional area of said leading end portion; superheating the molten material of said pool with said flame so as to prevent immediate freezing of the molten material discharged from said chamber, said superheating being beneficially influenced by the restricted heat transfer from said pool to said column; and continuously evacuating the superheated molten material from said chamber.

2. A method as defined in claim 1, wherein said flame extends across a major part of the cross-section of said remaining portion.

3. A method as defined in claim 1, wherein said melting is effected in a manner to maintain the ratio of the cross-section of said remaining portion to the cross-section of said leading end of such large magnitude that the heat flow from said molten material through said column only insignificantly influences said superheating.

4. A method as defined in claim 1, wherein said melting is effected in a manner to maintain the dimensions of said leading end portion part of such small magnitude that substantial heat transfer from said molten material to said column is prevented.

5. A method as defined in claim 1, wherein at least part of the molten material flows downwardly along the wall of the melting chamber to form a thermal barrier protecting the wall.

6. A method as defined in claim 1, and further comprising the step of carburizing said molten material.

7. A method as defined in claim 6, wherein said carburization is performed at said bottom.

8. A method as defined in claim 1, said bottom being provided with a fire-resistant lining, and wherein said flame is positioned at a sufficient distance above said bottom as to permit said molten material to form a thermal barrier for said bottom region.

9. A method as defined in claim 8, wherein said pool of molten material on said bottom forms said thermal barrier.

* * * * *